United States Patent
Togashi

(10) Patent No.: US 7,187,479 B2
(45) Date of Patent: Mar. 6, 2007

(54) IMAGE READING APPARATUS

(75) Inventor: Kazunori Togashi, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 861 days.

(21) Appl. No.: 10/310,046

(22) Filed: Dec. 5, 2002

(65) Prior Publication Data

US 2003/0107784 A1  Jun. 12, 2003

(30) Foreign Application Priority Data

Dec. 7, 2001  (JP) ............... 2001-374852

(51) Int. Cl.
*H04N 1/04* (2006.01)
*H04N 1/46* (2006.01)

(52) U.S. Cl. .............. 358/497; 358/483; 358/486; 358/488; 358/474; 358/505; 358/514

(58) Field of Classification Search ........... 358/474, 358/497, 449, 486, 488, 505, 501, 496, 494, 358/401, 483, 482, 471, 514; 250/234–236, 250/222.1; 399/380, 379, 211, 212; 382/312, 382/318, 319
See application file for complete search history.

(56) References Cited

U.S. PATENT DOCUMENTS

| | | | | |
|---|---|---|---|---|
| 5,223,904 A | * | 6/1993 | Umezawa | 399/376 |
| 5,693,933 A | * | 12/1997 | Takasu et al. | 250/208.1 |
| 5,778,276 A | * | 7/1998 | Hasegawa | 399/17 |
| 5,900,950 A | * | 5/1999 | Hsu | 358/497 |
| 5,917,616 A | * | 6/1999 | Chou et al. | 358/488 |
| 5,973,797 A | * | 10/1999 | Tanaka et al. | 358/488 |
| 6,163,388 A | * | 12/2000 | Lee et al. | 358/488 |
| 6,734,996 B1 | * | 5/2004 | Lee | 358/486 |
| 6,750,989 B1 | * | 6/2004 | Kamada et al. | 358/488 |
| 6,842,269 B2 | * | 1/2005 | Chen et al. | 358/474 |
| 6,965,461 B1 | * | 11/2005 | Chiang et al. | 358/497 |
| 2003/0010903 A1 | * | 1/2003 | Hsu | 250/222.1 |

* cited by examiner

*Primary Examiner*—Cheukfan Lee
(74) *Attorney, Agent, or Firm*—Fitzpatrick, Cella, Harper & Scinto

(57) ABSTRACT

An image reading apparatus includes a sensor including a plurality of photoelectric converters for reading information on a document, a detecting circuit for detecting movement of a document cover, a drive circuit for supplying driving pulses for driving the sensor, and a control circuit for controlling the drive circuit so that the driving pulses are changed according to a detection result generated by the detecting circuit.

20 Claims, 6 Drawing Sheets

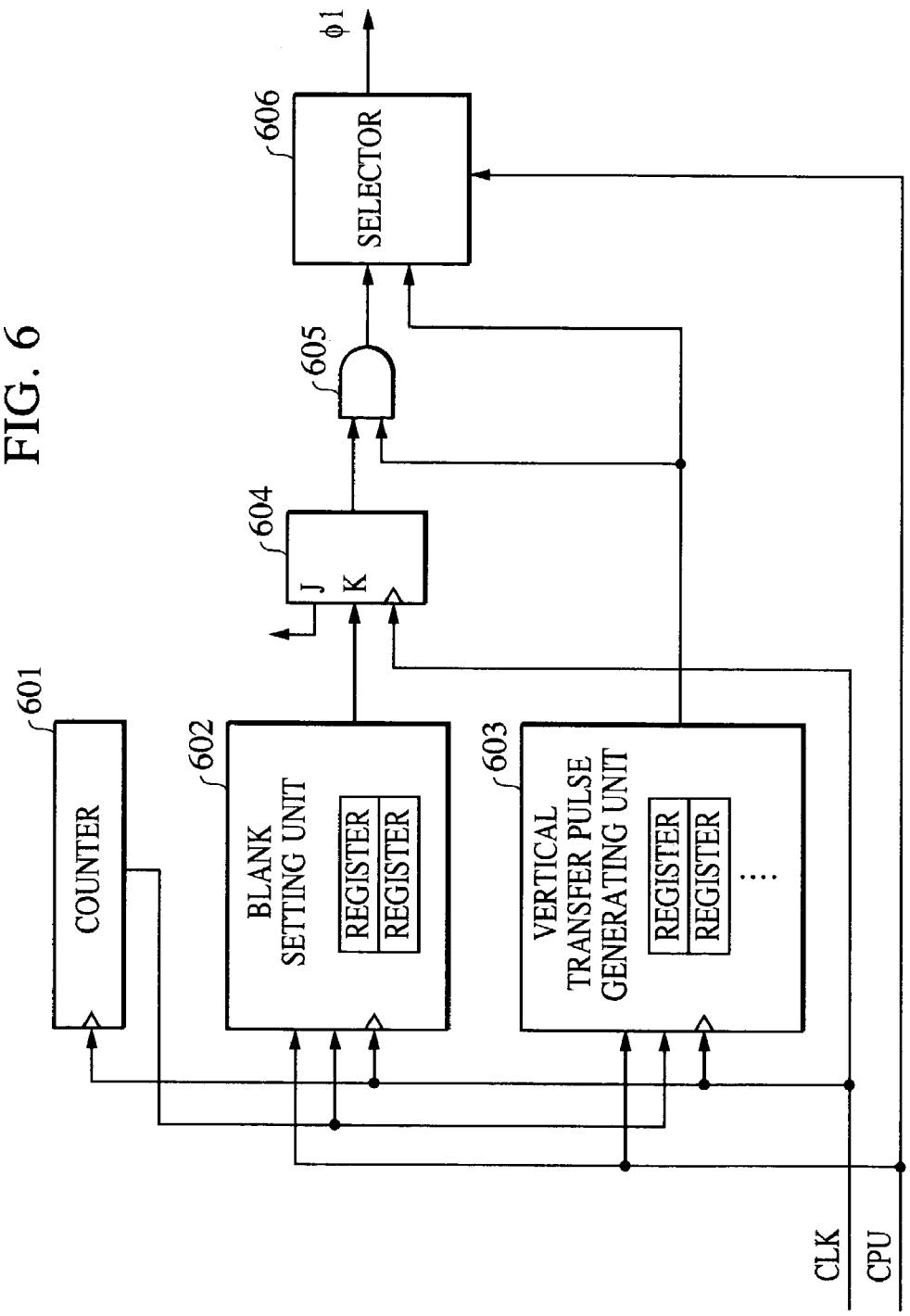

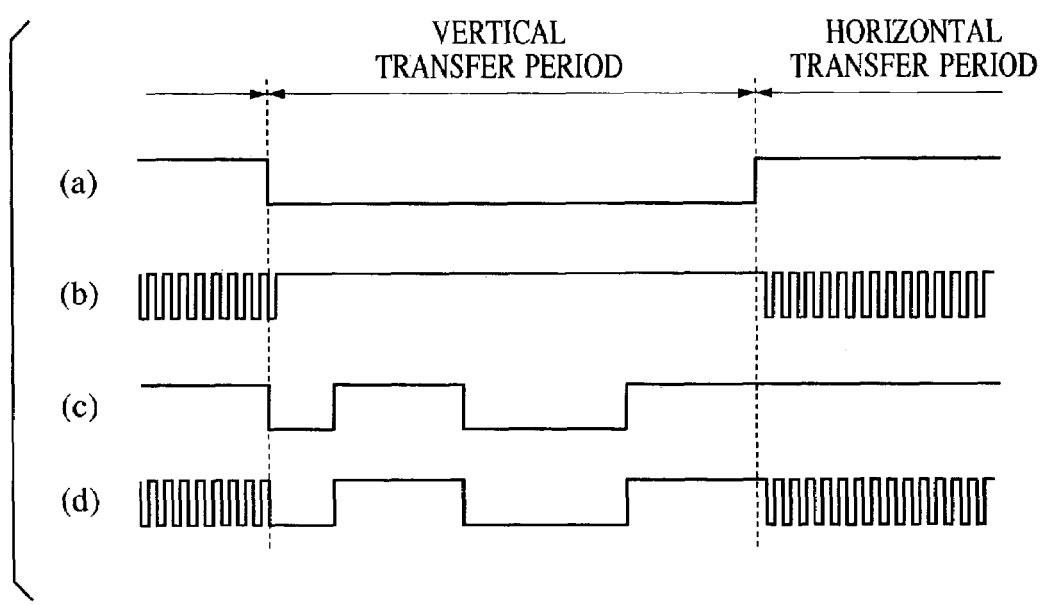

IMAGE READING APPARATUS

BACKGROUND OF THE INVENTION

1. Field of the Invention

The present invention relates to an image reading apparatus such as a copying machine.

2. Description of the Related Art

Hitherto, image reading apparatuses using a charge-coupled device (CCD) line sensor for scanning and reading a document placed on a glass table have been known. Some of these image reading apparatuses have a function of automatically detecting the size of a document placed on the glass table. Also, the size of paper to be copied and the scale are automatically set.

A variety of methods can be used in order to detect the size of a document. According to one of the methods, a reflective sensor for detecting the size of a document is placed at a specific position in the main and sub scanning directions under the glass table. Then, the existence of the document at the specific position is detected by the sensor so as to determine the size of the document based on the detection result. According to another method, when a command of reading a document is output, the whole document area is scanned and read (pre-scan) before reading, and the size of the document is detected based on the output image signal.

In the method using only the reflective sensor, many sensors corresponding to various sizes of a document that can be placed on the glass table are necessary, and thus the configuration becomes complicated and the cost increases. On the other hand, in the method using a pre-scan, the pre-scan must be performed every time a document is placed on the glass table. Therefore, it takes time from when a command for starting reading is output until image reading is completed.

Accordingly, a method in which the above-described two methods are combined has been proposed. In this method, an open/closed state of a cover for covering a glass table is recognized and image data when the cover is half-closed is compared with image data when the cover is completely closed. Accordingly, the size in the main scanning direction is detected, and the size in the sub scanning direction is detected by using the known reflective sensor.

In this method, when the cover is half-closed, the area other than the document area does not reflect the light from a light source, and is read as black. On the other hand, when the cover is completely closed, the area other than the document area is read as white (when the rear side of the cover is white). Thus, by comparing the image data, the document area can be recognized and thus the size of the document can be detected.

In this method, only a reflective sensor for sub scanning direction is required and pre-scan need not to be performed, and thus time for reading the document is shortened. In the above-described method, however, data read by a CCD is used in order to detect the size in the main scanning direction. Accordingly, the CCD must be driven during a standby mode in which reading is not performed so as to read a document.

In the above-described method of detecting the size of a document, the CCD is always driven even when reading is not performed, and thus electrical power is wasted. Also, the temperature of the CCD rises when the CCD is driven. In a color sensor, in particular, temperature degradation in a color filter may be caused. The degradation in a color filter results in variation in the spectral characteristic, and may have a bad effect on a read color image. Also, a fan may be provided in the apparatus in order to suppress rise in the temperature of the CCD. In this case, however, vibration caused by rotation of the fan badly affects the image, for example, color drift is caused. Further, the cost increases.

SUMMARY OF THE INVENTION

The present invention provides an image reading apparatus in which power consumption and heat generated in a sensor can be reduced.

In particular, the present invention provides an image reading apparatus comprising a sensor including a plurality of photoelectric converters for reading information on a document; a detecting circuit for detecting movement of a document cover; a drive circuit for supplying driving pulses for driving the sensor; and a control circuit for controlling the drive circuit so that the driving pulse is changed according to a detection result generated by the detecting circuit.

Also, the present invention provides a method for controlling an image reading apparatus comprising a sensor having a plurality of photoelectric converters for reading information on a document. The method comprises a step of detecting a movement of a document cover; a step of supplying a driving pulse for driving the sensor; and a step of changing the driving pulse according to a result of the step of detecting the movement of the document cover.

Further features and advantages of the present invention will become apparent from the following description of the preferred embodiment with reference to the attached drawings.

BRIEF DESCRIPTION OF THE DRAWINGS

FIG. 6 shows a circuit for generating a clock for driving CCD transfer units of the line sensor used in the image reading apparatus.

FIG. 7 shows pulses generated in the circuit for generating the clock for driving the CCD transfer units of the line sensor used in the image reading apparatus.

DESCRIPTION OF THE PREFERRED EMBODIMENT

Hereinafter, a preferred embodiment of an image reading apparatus according to the present invention will be described with reference to the drawings.

Figure 1:
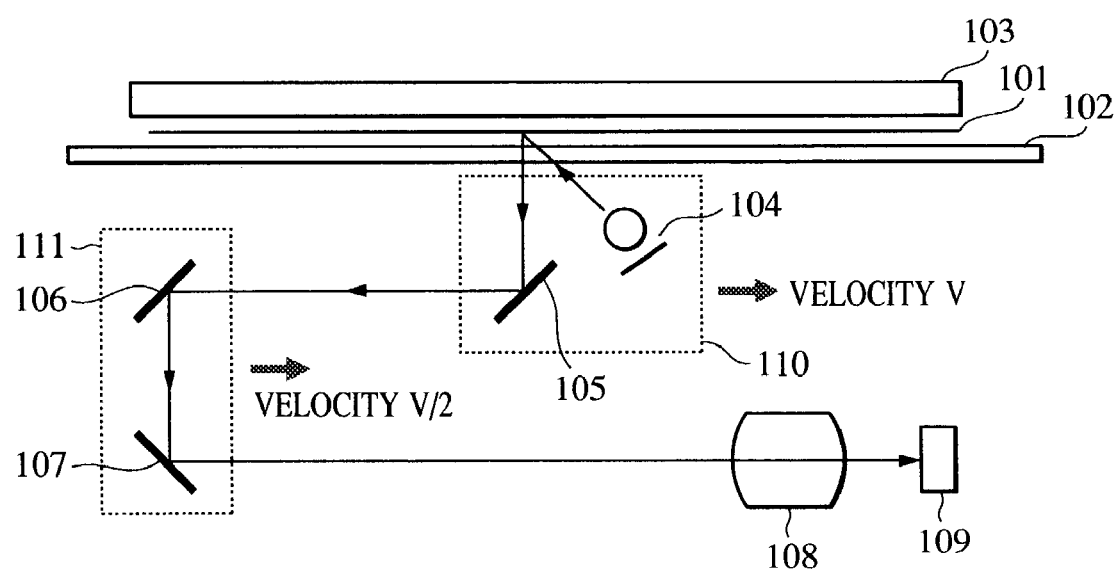
FIG. 1 is a view showing a schematic configuration of an image reading apparatus according to the embodiment of the present invention.

FIG. 1 is a schematic view showing the overall configuration of an image reading apparatus of the embodiment. In FIG. 1, reference numeral 101 denotes a document. The image reading apparatus includes a glass table 102 on which the document 101 is placed and a cover 103 which covers the glass table 102 and which can be opened and closed. In the image reading apparatus, the document 101 placed on the glass table 102 is illuminated by a lamp 104, and the light reflected at the document 101 is focused onto a charge-coupled device (CCD) 109 through a first mirror 105, a second mirror 106, a third mirror 107, and a lens 108.

In order to read the document 101, a first mirror unit 110, indicated by a broken line, moves in the sub scanning direction along the glass table 102 while the lamp 104 illuminates the document 101 so that the whole area of the document 101 on the glass table 102 can be scanned. The light reflected at the document 101 is focused onto the CCD 109, as described above, and is then photoelectrically converted. An output signal from the CCD 109 is processed in a circuit at the subsequent stage to form an image.

Figure 2A:
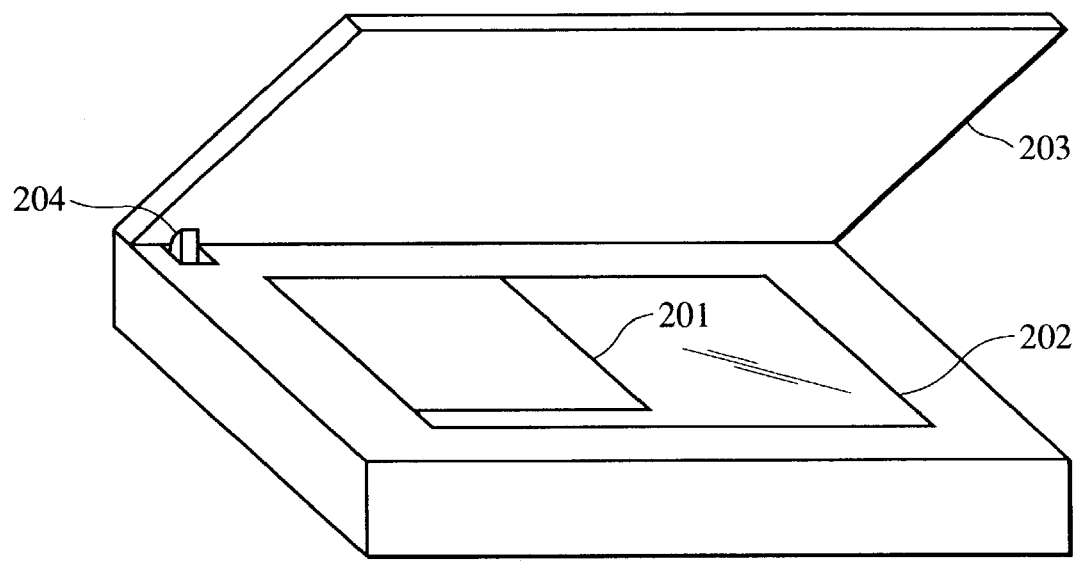
FIGS. 2A and 2B show a schematic configuration of a cover used in the image reading apparatus.
Figure 2B:
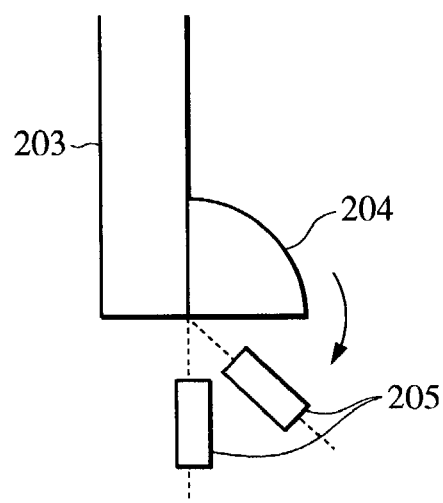

FIG. 2A shows the cover used in the image reading apparatus shown in FIG. 1. A cover 203 is configured so as to cover a document 201 and a glass table 202. A detecting member 204 for detecting the open/closed state of the cover 203 is provided in the cover 203. Also, two photosensors 205 are provided near the detecting member 204, as shown in FIG. 2B. The open/closed state of the cover 203, that is, the movement of the cover 203 can be recognized when the photosensors 205 are obstructed by the detecting member 204 by opening or closing the cover 203. With the configuration shown in FIGS. 2A and 2B, a half-open state and a closed state of the cover 203 can be detected.

Figure 3:
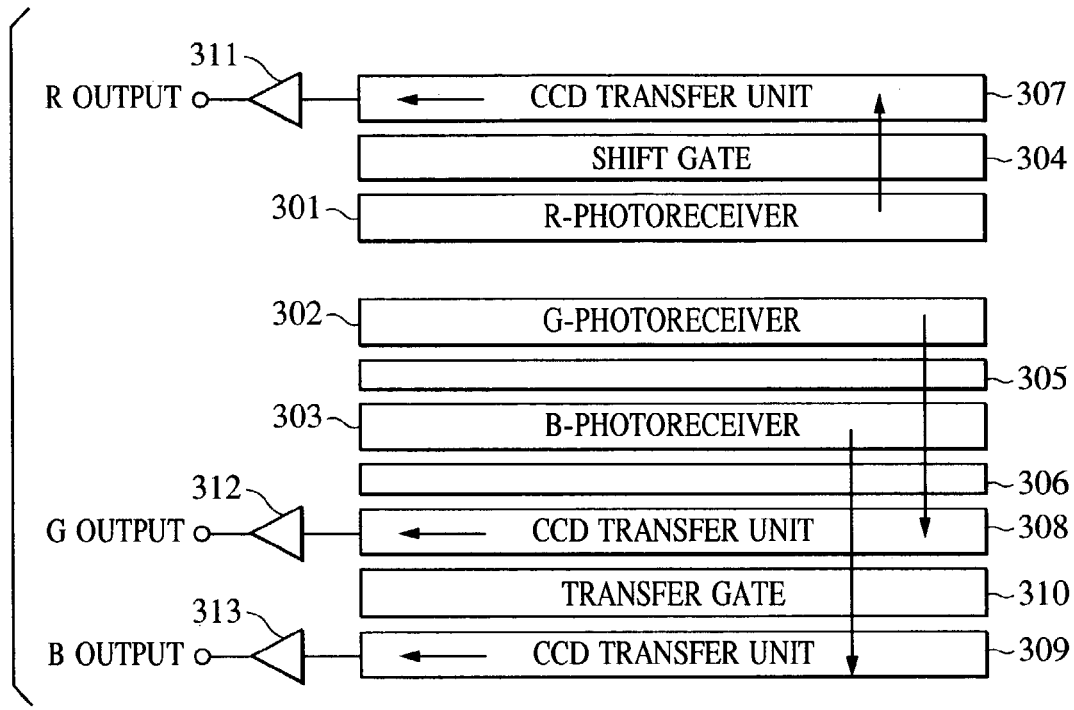
FIG. 3 shows the configuration of a line sensor used in the image reading apparatus.

FIG. 3 shows the configuration of a three-color line sensor used in the image reading apparatus. In this line sensor, instead of a CCD transfer unit being provided adjacent to each of RGB photoreceivers, CCD transfer units sandwich the RGB photoreceivers (for use in an in-pixel transfer method). In this configuration, since CCD transfer units need not be provided between the RGB photoreceivers, the gap between the photoreceivers can be reduced compared to a known line sensor. In this embodiment, the configuration shown in FIG. 3 will be described in detail later. A CCD-type line sensor in which a CCD transfer unit is provided adjacent to each of the RGB photoreceivers may be used.

In FIG. 3, the line sensor includes an R-photoreceiver 301 having a red color filter, a G-photoreceiver 302 having a green color filter, and a B-photoreceiver 303 having a blue color filter. Also, shift gates 304, 305, and 306 for vertically transferring signal charge accumulated in each of the RGB photoreceivers to corresponding CCD transfer units 307, 308, and 309 are provided. The CCD transfer units 307, 308, and 309 horizontally transfer the signal charge transferred from the RGB photoreceivers through the shift gates 304, 305, and 306, respectively, to output terminals. Also, the CCD transfer units 307, 308, and 309 are driven by two pulse signals, that is, $\phi 1$ and $\phi 2$.

For simplicity, one CCD transfer unit is provided for one photoreceiver in this embodiment. In a general line sensor, however, signal charge is transferred by dividing it into odd-numbered and even-numbered charges.

Further, the line sensor includes a transfer gate 310 for transferring the signal charge from one of the CCD transfer units to another, and amplifiers 311, 312, and 313 for converting the signal charges transferred from the CCD transfer units 307, 308, and 309, respectively, to voltage signals.

Figure 4:
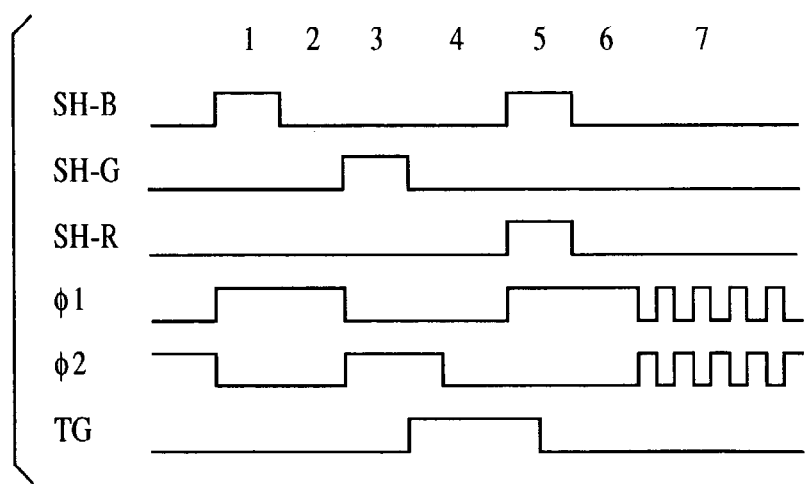
FIG. 4 shows driving pulse signals of the line sensor used in the image reading apparatus.

Next, scanning performed by the line sensor by the in-pixel transfer method will be described with reference to a timing chart of driving pulse signals shown in FIG. 4. SH-B is a control pulse signal for the shift gate 306 and controls vertical transfer of the signal charge in the B-photoreceiver 303 to the CCD transfer unit 308. Likewise, SH-G and SH-R are shift pulse signals for controlling the shift gates 305 and 304, respectively. $\phi 1$ and $\phi 2$ are pulse signals for driving the CCD transfer units 307, 308, and 309. TG is a pulse signal for controlling the transfer gate 310.

During period 1, the shift gate 306 is turned ON by pulse signal SH-B so that the B-signal charge accumulated in the B-photoreceiver 303 is moved to the shift gate 306. During period 2, the shift gate 306 is turned OFF so that the B-signal charge in the shift gate 306 is moved to the CCD transfer unit 308. Accordingly, the B-signal charge accumulated in the B-photoreceiver 303 is vertically transferred to the CCD transfer unit 308.

During period 3, the B-signal charge moves from $\phi 1$ to $\phi 2$ inside the CCD transfer unit 308. Then, during period 4, $\phi 2$ is turned OFF and pulse signal TG is turned ON so that the B-signal charge is transferred to the transfer gate 310. Likewise, the shift gate 305 is turned ON by using pulse signal SH-G during period 3, and G-signal charge accumulated in the G-photoreceiver 302 is transferred to the B-photoreceiver 303 during period 4.

During period 5, the B-signal charge in the transfer gate 310 is transferred to the CCD transfer unit 309 by turning OFF pulse signal TG and turning ON pulse signal $\phi 1$. Also, during periods 5 and 6, the G-signal charge in the B-photoreceiver 303 is transferred to the CCD transfer unit 308 by turning ON pulse signal SH-B. Further, by turning ON the shift gate 304 by using pulse signal SH-R, R-signal charge accumulated in the R-photoreceiver 301 is transferred to the CCD transfer unit 307.

As described above, the signal charge accumulated in each photoreceiver is vertically transferred to the corresponding CCD transfer unit. Then, during period 7, each of the CCD transfer units is driven at high-speed by pulse signals $\phi 1$ and $\phi 2$, and the signal charges are horizontally transferred to the output terminals.

In general, each of the CCD transfer units is a large capacitive load and thus a large amount of electrical power is required in order to drive the CCD transfer units at high-speed. Further, the heat value of the CCD is very high at this time. Accordingly, the reading unit should be controlled so that horizontal transfer, in which the CCD transfer units are driven at high-speed, is not performed when reading is unnecessary.

Figure 5:
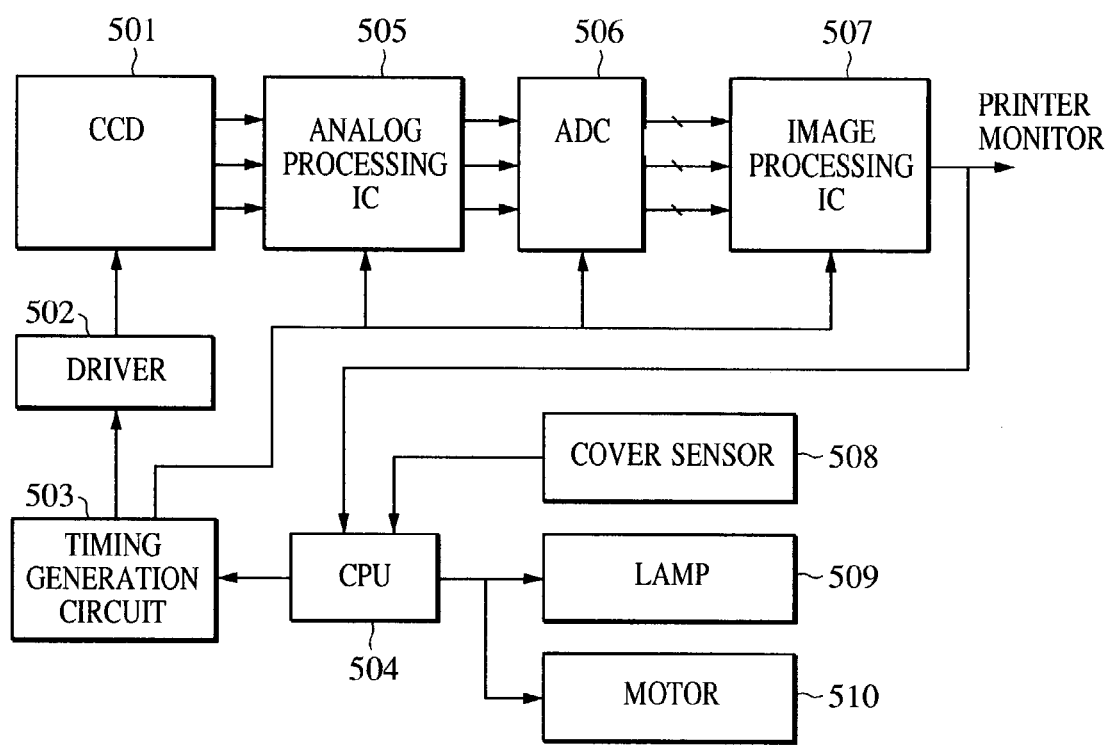
FIG. 5 is a block diagram showing a reading control unit of the image reading apparatus.

Next, a control unit in the reading unit of the image reading apparatus will be described with reference to a block diagram shown in FIG. 5. In FIG. 5, the control unit includes a CCD line sensor 501 (CCD 109 in FIG. 1), which is driven by a driver 502. A timing generation circuit 503 generates various CCD-driving pulses and also generates the driving pulse signals shown in FIG. 4. Pulse signals $\phi 1$ and $\phi 2$ for driving the CCD transfer units output from the timing generation circuit 503 have two modes: a mode for outputting only pulses for performing vertical transfer; and a mode for outputting pulses which are input to the CCD during normal reading. Each of the two modes is controlled by a CPU 504.

The signal output from the CCD 501 is gain/offset-adjusted by an analog processing IC 505 and is transmitted to an AD converter 506 at the subsequent stage. The analog signal is converted to a digital signal in the AD converter 506. An image processing IC 507 receives the digital signal from the AD converter 506 and performs various processes such as shading correction and inter-line correction. The timing generation circuit 503 supplies a timing signal to the above-described ICs so as to control the timing of the operation thereof.

Reference numeral 508 denotes a cover sensor (detecting member 204 and photosensors 205), which detects whether the cover is opened/closed at a predetermined angle or whether the cover is closed for detecting the size of a document and transmits a detection signal to the CPU 504.

A lamp 509 (lamp 104 in FIG. 1) and a motor 510 are controlled by the CPU 504 and operate in response to commands from the CPU 504 in order to read a document or detect the size of the document. The CPU 504 contains a program for detecting the size of a document. The size of the document is detected by comparing image data when the cover is opened/closed at a predetermined angle with image data when the cover is closed.

Next, a method for generating pulse signals φ1 and φ2 for driving the CCD transfer units in the timing generation circuit 503 will be described. FIG. 6 shows a circuit for generating pulse signal φ1 and FIG. 7 shows waveforms of the pulse signal generated in each unit. In FIG. 6, the pulse signal generation circuit includes a counter 601 which operates in synchronization with a clock signal CLK, and a blank setting unit 602 for generating a pulse signal which becomes low at the starting and ending points of the vertical transfer period of pulse signal φ1. The blank setting unit 602 includes two registers which set the counter values at the starting and ending points of the vertical transfer period of pulse signal φ1. The set register value is compared to the value of the counter 601 by a comparator (not shown) and the above-described pulse signal is generated based on the comparison result. The output pulse signal is shown in (a) of FIG. 7.

A vertical transfer pulse generating unit 603 generates pulses in the vertical transfer period of pulse signal φ1. The basic configuration thereof is the same as that of the blank setting unit 602. The vertical transfer pulse generating unit 603 includes a plurality of registers which set the counter values at the leading edge and the trailing edge of the vertical transfer period of pulse signal φ1. The set value is compared to the value of the counter 601 and a vertical transfer pulse is generated based on the comparison result ((c) in FIG. 7).

The circuit also includes a JK flip-flop 604. A pulse generated at the blank setting unit 602 is input to a K-terminal thereof. The J-terminal is set to high (H), and thus a signal shown in (b) of FIG. 7 is output.

The blank setting unit 602, the vertical transfer pulse generating unit 603, and the JK flip-flop 604 operate in synchronization with the clock signal CLK. Also, the registers in the blank setting unit 602 and the vertical transfer pulse generating unit 603 are set by the CPU when an initial setting is performed, for example, when the power of the apparatus is turned on. The outputs of the JK flip-flop 604 and the vertical transfer pulse generating unit 603 are input to an AND circuit 605. The output from the AND circuit 605 is shown in (d) of FIG. 7, and a pulse signal including vertical transfer pulses and horizontal transfer pulses is generated.

A selector 606 selects one of the two inputs and outputs the selected input. The signal from the AND circuit 605 and the signal from the vertical transfer pulse generating unit 603 are input to the selector 606, which selects the signal to be output based on the control of the CPU. That is, the selector 606 selects one of pulse signal φ1 having only the vertical transfer pulses and pulse signal φ1 having both the vertical transfer pulses and the horizontal transfer pulses, and supplies the selected pulse signal to the CCD driver 502 (FIG. 5). Pulse signal φ2 is generated in the same way as in the case of pulse signal φ1, and one pulse signal can be selected from two types of pulse signals so as to be output.

Herein, regarding pulse signals φ1 and φ2 for driving the CCD transfer units, a mode in which a pulse signal including only the vertical transfer pulses is output is referred to as mode 1, and a mode in which a pulse signal including the vertical transfer pulses and the horizontal transfer pulses used for normal reading is output is referred to as mode 2. Next, a method for controlling each mode when the size of a document is detected will be described.

When the image reading apparatus is not operated, that is, in a standby mode, the CCD 501 is not required to be in a reading mode. Thus, the timing generation circuit 503 is set to mode 1 by the CPU 504. Also, the CPU 504 drives the motor 510 so that the first mirror unit 110 moves to the size detecting position.

At this time, the user opens the cover (the cover is opened to a predetermined angle or more). The cover sensor 508 detects that the cover is opened and the CPU 504 recognizes that the cover is opened. The CPU 504 sets the timing generation circuit 503 to mode 2 so that the CCD 501 is set to a reading mode. Then, when the user puts a document on the glass table 202 and the cover is closed to a predetermined angle, the cover sensor 508 detects that fact and transmits it to the CPU 504. The CPU 504 controls the illumination of the lamp 509 and also controls the reading of the document placed on the glass table 202.

After that, when the cover is completely closed, the cover sensor 508 detects that fact and transmits it to the CPU 504. The CPU 504 controls the illumination of the lamp 509 again when it detects that the cover is completely closed, and controls reading of the document placed on the glass table 202.

The CPU 504 compares image data which is previously read with image data when the cover is completely closed so as to detect the size in the main scanning direction of the document placed on the glass table 202. When the size of the document has been detected, the CPU 504 drives the motor 510 and controls the first mirror unit 110 so that the first mirror unit 110 moves to the home position (position for reading a standard white for shading correction). According to requirements, the standard white for shading correction may be read and gain/offset-adjustment may be performed. When the user presses a start key, the CPU 504 controls each unit so as to read the whole document area.

After the document has been read, the CPU 504 sets the timing generation circuit 503 to mode 1 so that the CCD 501 enters a standby mode. Then, the first mirror unit 110 is moved to the size detecting position so as to enter a mode for preparing for the next size-detecting operation. In this embodiment, only the vertical transfer pulses are supplied to the CCD line sensor 109 during the standby mode. This is because the frequency of the vertical transfer pulse is not so high and thus does not have a great influence on power consumption. Further, by supplying the vertical transfer pulses to the CCD line sensor 109, the configuration of the timing generation circuit 503 and so on can be simplified. Incidentally, the vertical transfer pulses need not be supplied to the CCD line sensor 109 during the standby mode, although the circuit configuration becomes more complicated, which is disadvantageous.

When the above-described control is performed, in a case where the cover is left opened or in a case where the start key is not pressed after the size of the document has been detected, the CCD remains in a reading mode. In order to prevent such a situation, when the cover is left opened, a timer is started when the cover is opened, and the timing generation circuit 503 is changed from mode 2 to mode 1 when a predetermined time has passed.

In this case, however, the CCD is not in a reading mode, and thus the size of the document cannot be detected even when the cover is closed. At this time, the user manually sets the size of the document, or the user is encouraged to open and close the cover again, so as to detect the size of the document.

If the start key is not pressed after the size of the document has been detected, the timer is started when the cover is closed, as in the above-described case. After a predetermined time has passed, the timing generation circuit 503 is changed from mode 2 to mode 1. In this case, when the user presses the start key, the mode is changed again, the CCD is set to the reading mode, and then an image is read.

As described above, the image reading apparatus of the present invention has a configuration in which the CCD can be switched to/from a reading mode and a standby mode according to the open/closed state of the cover. The CCD is set to the reading mode only when the CCD detects the size of a document in the main scanning direction. Other than that, the CCD may be in the standby mode. Accordingly, a rise in the temperature of the CCD can be suppressed and thus the temperature degradation in a color filter of the color sensor can be suppressed. Also, since horizontal transfer, which needs a large amount of electrical power, is not always performed by the CCD transfer units, the power consumption can be reduced. Furthermore, heat generated from the CCD and the driver for driving the CCD transfer units decreases, and thus a cooling system such as a fan need not be provided.

In this embodiment, the CCD is always turned on after the image reading apparatus is turned on. This is because the effect of suppressing a rise in the temperature when the CCD is always turned on is almost the same as when the CCD is turned on only when required. Also, in order to control the power, the time from the turning on of the power until the CCD enters the reading mode has to be considered, and thus a complicated control is required.

In this embodiment, drive control performed when the size of a document is detected has been described. However, the above-described driving modes (mode 1 and mode 2) may be applied to an image reading apparatus which does not have a function of detecting the size of a document. By pressing a start key, a horizontal transfer drive pulse may be supplied to the line sensor so as to read the document. Also, by detecting the open/closed state of the cover and by supplying a horizontal transfer drive pulse to the line sensor, the time from pressing the start key until the reading operation can be shortened.

Each functional block and processes described in the embodiment may be formed by hardware, or may be formed by a microcomputer system including a CPU or an MPU, a ROM, and a RAM, and the operation may be realized according to an operation program stored in the ROM or the RAM. Alternatively, a software program for realizing the function of each functional block may be supplied to the RAM so that each of the above-described functional blocks operates in accordance with the program.

In this case, the software program itself realizes the functions of the above-described embodiment. Also, the program itself and a system for supplying the program to a computer, for example, a storage medium storing the program, are included in the present invention. As a storage medium for storing the program, a floppy disk, a hard disk, an optical disk, a magnetooptical disk, a CD-ROM, a CD-I, a CD-R, a CD-RW, a DVD, a ZIP disk, a magnetic tape, or a nonvolatile memory card can be used as well as the ROM and the RAM.

Also, it is needless to say that the program is included in the present invention when the functions of the above-described embodiment are realized when the program cooperates with an operating system (OS) which operates in the computer or with other application software, as well as when the functions of the above-described embodiment are realized when the computer executes the supplied program.

Alternatively, after the supplied program is stored in a memory of an expansion board of a computer or an expansion unit connected to the computer, a CPU in the expansion board or the expansion unit may execute a part or whole of the actual process based on the program commands so that the process realizes the functions of the above-described embodiment.

As described above, according to the embodiment, by adequately switching the CCD between an operating mode and a standby mode at a preferred timing, a rise in the temperature can be suppressed so as to prevent temperature degradation and reduce power consumption. Accordingly, it is possible to provide an image reading apparatus in which the cost can be substantially reduced and an adequate operation can be ensured for a long period of time.

While the present invention has been described with reference to what is presently considered to be the preferred embodiment, it is to be understood that the invention is not limited to the disclosed embodiment. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image reading apparatus comprising:
   a sensor including a plurality of photoelectric converters for reading information on a document;
   a detecting circuit for detecting movement of a document cover;
   a drive circuit for supplying a driving pulse for driving said sensor; and
   a control circuit for controlling said drive circuit so that the driving pulse is changed according to a detection result generated by said detecting circuit.

2. The image reading apparatus according to claim 1, wherein said sensor includes an output device and a transfer unit for transferring a signal from at least one of said plurality of photoelectric converters to said output device,
   said drive circuit supplies a first driving pulse for transferring the signal from at least one of said plurality of photoelectric converters to said transfer unit and a second driving pulse for transferring the signal from said transfer unit to said output device, and
   said control circuit controls said drive circuit so that said drive circuit supplies the first driving pulse when the document cover is in a first position, and the first driving pulse and the second driving pulse when the document cover is in a second position.

3. The image reading apparatus according to claim 2, wherein said sensor includes a plurality of transfer units, each of said transfer units is a charge-coupled device, and at least one of said transfer units is adapted to transfer the signal to an adjacent one of said plurality of transfer units.

4. The image reading apparatus according to claim 1, wherein said control circuit controls said drive circuit so that the driving pulse is changed when a predetermined time from when said detecting circuit detects the movement of the document cover has elapsed.

5. The image reading apparatus according to claim 1, wherein said sensor include (i) a plurality of output devices, (ii) a plurality of transfer units each connected to a respective one of said plurality of output devices and each for transferring a signal from at least one of said plurality of photoelectric converters to said respective output device, (iii) a plurality of shift gates, and (iv) at least one transfer gate, said drive circuit supplies a first driving pulse for transferring the signal from at least one of said plurality of photoelectric converters to at least one of said plurality of transfer units and a second driving pulse for transferring the signal from said at least one of said plurality of transfer units to said respective output device, each of said plurality of shift gates is adapted to transfer the signal from one of said plurality of photoelectric converters to one of said plurality of transfer units and said transfer gate is adapted to transfer the signal from one of said plurality of transfer units to another of said plurality of transfer units in response to the first driving pulse, said control circuit controls said drive circuit so that said drive circuit supplies the first driving pulse when the document cover is in a first position, and the first driving pulse and the second driving pulse when the document cover is in a second position.

6. The image reading apparatus according to claim 1, further comprising a central processing unit that receives a detection result from said detecting circuit, wherein said sensor includes an output device and a transfer unit for transferring a signal from at least one of said plurality of photoelectric converters to said output device, said central processing unit selects a first mode having a first driving pulse which transfers the signal from at least one of said plurality of photoelectric converters to said transfer unit and a second mode having the first driving pulse and a second driving pulse which transfers the signal from said transfer unit to said output device, either the first mode or the second mode being selected based on the detection result from said detecting circuit, and said control circuit controls said drive circuit so that said drive circuit supplies the first driving pulse when said central processing unit selects the first mode, and the first driving pulse and the second driving pulse when said central processing unit selects the second mode.

7. The image reading apparatus according to claim 1, further comprising a central processing unit that receives a detection result from said detecting circuit, wherein said sensor includes (i) a plurality of output devices, (ii) a plurality of transfer units each connected to a respective one of said plurality of output devices and each for transferring a signal from at least one of said plurality of photoelectric converters to said respective output device, (iii) a plurality of shift gates, and (iv) at least one transfer gate, said central processing unit selects a first mode having a first driving pulse which transfers the signal from at least one of said plurality of photoelectric converters to at least one of said plurality of transfer units and a second mode having the first driving pulse and a second driving pulse which transfers the signal from at least one of said plurality of transfer units to said respective output device, either the first mode or the second mode being selected based on the detection result from said detecting circuit, said control circuit controls said drive circuit so that said drive circuit supplies the first driving pulse when said central processing unit selects the first mode, and the first driving pulse and the second driving pulse when said central processing unit selects the second mode, and each of said plurality of shift gates is adapted to transfer the signal from one of said plurality of photoelectric converters and said transfer gate is adapted to transfer the signal from one of said plurality of transfer units to another of said plurality of transfer units in at least the first mode.

8. The image reading apparatus according to claim 7, wherein each of said plurality of shift gates is adapted to transfer the signal from one of said plurality of photoelectric converters and said transfer gate is adapted to transfer the signal from one of said plurality of transfer units to another of said plurality of transfer units in the first and the second modes.

9. The image reading apparatus according to claim 1, wherein said detecting circuit includes a cover sensor.

10. A method for controlling an image reading apparatus comprising a sensor having a plurality of photoelectric converters for reading information on a document, the method comprising:

a step of detecting a movement of a document cover;

a step of supplying a driving pulse for driving the sensor; and a step of changing the driving pulse according to a result of said step of detecting the movement of the document cover.

11. The method according to claim 10, wherein the sensor includes (i) an output device and (ii) a transfer unit for transferring a signal from at least one of the plurality of photoelectric converters to the output device, said step of supplying a driving pulse includes supplying a first driving pulse for transferring the signal from at least one of the plurality of photoelectric converters to the transfer unit and a second driving pulse for transferring the signal from the transfer unit to the output device, and said step of changing the driving pulse supplies the first driving pulse when the document cover is in a first position, and the first driving pulse and the second driving pulse when the document cover is in a second position.

12. The method according to claim 11, wherein the sensor includes a plurality of transfer units, each of the transfer units is a charge-coupled device, and the driving pulse transfers the signal from at least one of the transfer units to an adjacent one of the plurality of transfer units.

13. The method according to claim 10, wherein said step of changing the driving pulse changes the driving pulse after a predetermined time has elapsed.

14. The method according to claim 10, wherein the sensor includes (i) a plurality of transfer units, (ii) a plurality of shift gates, and (iii) at least one transfer gate, each of the plurality of shift gates is adapted to transfer the signal from one of the plurality of photoelectric converters, and the transfer gate is adapted to transfer the signal from one of the plurality of transfer units to another of the plurality of transfer units in response to at least the first driving pulse.

15. The method according to claim 14, wherein each of the plurality of shift gates is adapted to transfer the signal from one of the plurality of photoelectric converters and the transfer gate is adapted to transfer the signal from one of the plurality of transfer units to another of the plurality of transfer units in response to the first and the second driving pulses.

16. An image reading apparatus comprising:
a sensor including a plurality of photoelectric converters for reading information on a document;
a detecting circuit for detecting movement of a document cover;
a drive circuit for supplying a driving pulse for driving said sensor; and
means for controlling said drive circuit so that the driving pulse is changed according to a detection result generated by said detecting circuit.

17. The image reading apparatus according to claim 16, wherein
said sensor includes an output device and a transfer unit for transferring a signal from at least one of said plurality of photoelectric converters to said output device,
said drive circuit supplies a first driving pulse for transferring the signal from at least one of said plurality of photoelectric converters to said transfer unit and a second driving pulse for transferring the signal from said transfer unit to said output device, and
said means for controlling controls said drive circuit so that said drive circuit supplies the first driving pulse when the document cover is in a first position, and the first driving pulse and the second driving pulse when the document cover is in a second position.

18. The image reading apparatus according to claim 16, wherein said means for controlling controls said drive circuit so that the driving pulse is changed when a predetermined time from when said detecting circuit detects the movement of the document cover has elapsed.

19. The image reading apparatus according to claim 16, wherein said means for controlling includes a timing generation circuit and a central processing unit.

20. The image reading apparatus according to claim 19, wherein
said sensor includes an output device and a transfer unit for transferring a signal from at least one of said plurality of photoelectric converters to said output device,
said central processing unit selects a first mode having a first driving pulse which transfers the signal from at least one of said plurality of photoelectric converters to said transfer unit and a second mode having the first driving pulse and a second driving pulse which transfers the signal from said transfer unit to said output device, either the first mode or the second mode being selected based on the detection result from said detecting circuit, and
said control circuit controls said drive circuit so that said drive circuit supplies the first driving pulse when said central processing unit selects the first mode, and the first driving pulse and the second driving pulse when said central processing unit selects the second mode.

* * * * *

UNITED STATES PATENT AND TRADEMARK OFFICE
CERTIFICATE OF CORRECTION

PATENT NO. : 7,187,479 B2  Page 1 of 1
APPLICATION NO. : 10/310046
DATED : March 6, 2007
INVENTOR(S) : Kazunori Togashi It is certified that error appears in the above-identified patent and that said Letters Patent is hereby corrected as shown below:

<u>COLUMN 9</u>:
Line 1, "include" should read --includes--.

Signed and Sealed this

Twenty-ninth Day of April, 2008

JON W. DUDAS
*Director of the United States Patent and Trademark Office*